United States Patent
Zhang et al.

(10) Patent No.: US 8,817,401 B2
(45) Date of Patent: Aug. 26, 2014

(54) ZERO GAIN START AND GAIN ACQUISITION BASED ON ADAPTIVE ANALOG-TO-DIGITAL CONVERTER TARGET

(71) Applicant: LSI Corporation, Milpitas, CA (US)

(72) Inventors: Haotian Zhang, Longmont, CO (US); Yu Liao, Longmont, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/652,706

(22) Filed: Oct. 16, 2012

(65) Prior Publication Data
US 2014/0104717 A1    Apr. 17, 2014

(51) Int. Cl.
*G11B 5/09*    (2006.01)

(52) U.S. Cl.
USPC .................. 360/46; 360/48; 360/39; 360/55; 360/67

(58) Field of Classification Search
None
See application file for complete search history.

(56) References Cited

U.S. PATENT DOCUMENTS 7,817,366 B1 * 10/2010 Pai et al. ................... 360/46
2006/0023328 A1 * 2/2006 Annampedu ............... 360/46

* cited by examiner

*Primary Examiner* — Muhammad N Edun
(74) *Attorney, Agent, or Firm* — Advent, LLP

(57) ABSTRACT

Aspects of the disclosure pertain to a system and method for providing zero gain start (ZGS) and gain acquisition based on an adaptive analog-to-digital converter (ADC) target. The adaptive ADC target is used to collect channel characteristics and based on the adaptive ADC target, an adjusted 2T amplitude target value is generated.

12 Claims, 3 Drawing Sheets

ZERO GAIN START AND GAIN ACQUISITION BASED ON ADAPTIVE ANALOG-TO-DIGITAL CONVERTER TARGET

BACKGROUND

A read channel is a circuit in a disk drive which: 1) encodes data bits into magnetic flux changes for recording; and 2) decodes magnetic flux changes into bits for reading. Current read channel systems suffer from performance issues.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing zero gain start (ZGS) and gain acquisition based on an adaptive analog-to-digital converter (ADC) target.

BRIEF DESCRIPTION OF THE DRAWINGS

The detailed description is described with reference to the accompanying figures.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

A read channel is a circuit in a disk drive which: 1) encodes data bits into magnetic flux changes for recording; and 2) decodes magnetic flux changes into bits for reading. A read channel system is configured for performing retained sector reprocessing (RSR) when processing sectors of data. In a typical read channel system, a data buffer, such as a Y-buffer, is implemented for temporarily storing data (e.g., sectors) received by the read channel system.

Typical zero gain start (ZGS) designs implement a zero-forcing (ZF) algorithm. For typical ZGS designs, a 2T amplitude target used by ZGS is a given fixed value, without considering various channel conditions such as: channel bit density (CBD), signal-to-noise ratio (SNR), noise combination, etc. This is the root cause of an observed ZGS bias that can be up to several decibels (dB) in typical ZGS designs. A similar issue can exist in the gain acquisition stage for typical ZGS designs, in which the given fixed 2T amplitude target value is used to calculate an error term for a gain loop.

As more fully set forth below, aspects of the disclosure include a system and method for providing zero gain start (ZGS) and gain acquisition based on an adaptive analog-to-digital converter (ADC) target.

Figure 1:
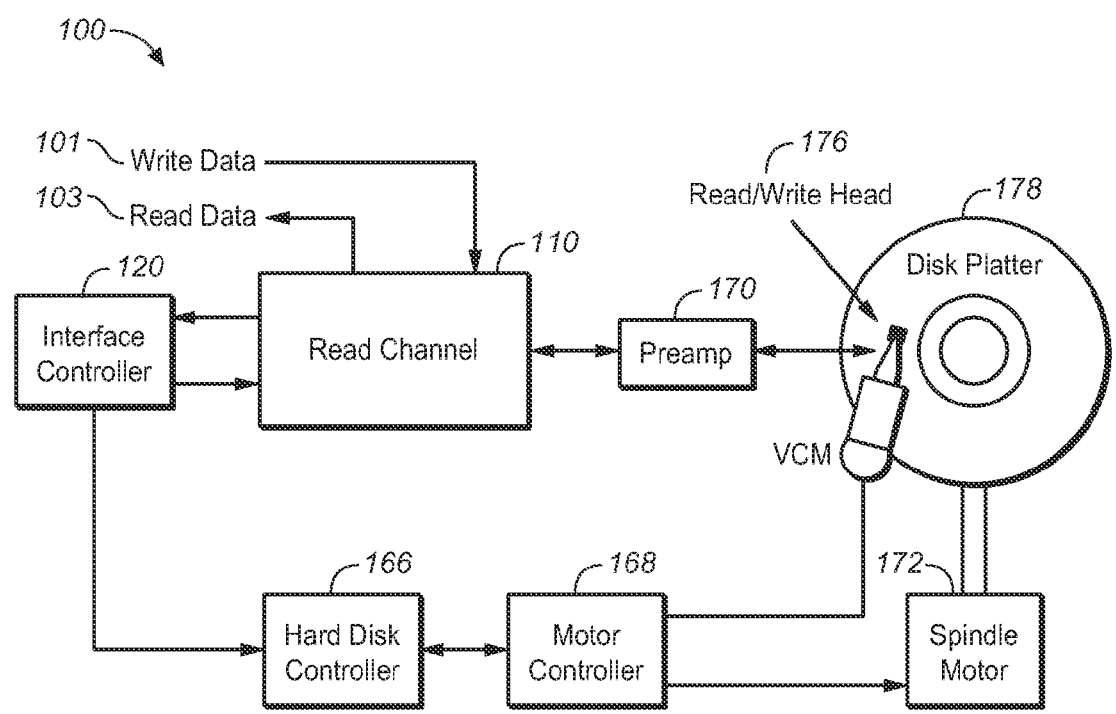
FIG. 1 is an example conceptual block diagram schematic of a storage system.

In FIG. 1 a storage system 100 is illustrated. The storage system 100 includes a read channel circuit 110 in accordance with an example implementation of the present disclosure. In embodiments, the storage system 100 is, for example, a hard disk drive (HDD). As shown, the storage system 100 includes a preamplifier 170, an interface controller 120, a hard disk controller 166, a motor controller 168, a spindle motor 172, a disk platter 178, and a read/write head assembly 176 (e.g., transducer). The interface controller 120 controls addressing and timing of data to/from the disk platter 178, and is configured for interacting with a host controller. In embodiments, the data on the disk platter 178 includes groups of magnetic signals that are detected by the read/write head assembly 176 when the assembly is properly positioned over disk platter 178. In one or more implementations, the disk platter 178 includes magnetic signals recorded in accordance with either a longitudinal or a perpendicular recording scheme.

In a typical read operation, the read/write head assembly 176 is accurately positioned by the motor controller 168 over a desired data track on the disk platter 178. The motor controller 168 positions the read/write head assembly 176 in relation to the disk platter 178 and drives the spindle motor 172 by moving the read/write head assembly 176 to the proper data track on the disk platter 178 under the direction of the hard disk controller 166. The spindle motor 172 spins the disk platter 178 at a determined spin rate (e.g., at a determined number of revolutions per minute (RPM)). Once the read/write head assembly 176 is positioned adjacent to the proper data track, magnetic signals representing data on the disk platter 178 are sensed by the read/write head assembly 176 as the disk platter 178 is rotated by the spindle motor 172. The sensed magnetic signals are provided as a continuous, minute analog signal representative of the magnetic data on the disk platter 178. This minute analog signal is transferred from the read/write head assembly 176 to the read channel circuit 110 via a preamplifier 170. The preamplifier 170 is operable to amplify the minute analog signals accessed from the disk platter 178. In turn, the read channel circuit 110 decodes and digitizes the received analog signal to recreate the information originally written to the disk platter 178. This data is provided as read data 103 to a receiving circuit. A write operation is substantially the opposite of the preceding read operation with write data 101 being provided to the read channel circuit 110. This data is then encoded and written to the disk platter 178.

As part of processing the received information, read channel circuit 110 applies a data detection algorithm to the received data set to yield a detected output. Soft information from the detected output is used to calculate a quality metric. In embodiments, the quality metric is an information divergence. Later applications of the data detection algorithm and a data decode algorithm are prioritized based at least in part on the quality metric.

It should be noted that, in embodiments, the storage system 100 is integrated into a larger storage system such as, for example, a RAID (redundant array of inexpensive disks or redundant array of independent disks) based storage system. RAID storage systems increase stability and reliability through redundancy, combining multiple disks as a logical unit. In this manner, data is spread across a number of disks included in the RAID storage system according to a variety of algorithms and accessed by an operating system as if the RAID storage system were a single disk drive. For example, data may be mirrored to multiple disks in the RAID storage system, or may be sliced and distributed across multiple disks using a number of techniques. If a small number of disks in the RAID storage system fail or become unavailable, error correction techniques are used to recreate the missing data based on the remaining portions of the data from the other disks in the RAID storage system. In embodiments, the disks in the RAID storage system are individual storage systems such as storage system 100, and are located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk drive.

In embodiments, a data decoder circuit used in relation to read channel circuit 110 is a low density parity check (LDPC) decoder circuit. Low density parity check technology is applicable to transmission of information over various channels and/or information storage systems on various media. Transmission applications include, but are not necessarily limited to: optical fiber, radio frequency channels, wired or wireless local area networks, digital subscriber line technologies, wireless cellular, Ethernet over various mediums such as copper or optical fiber, cable channels such as cable television, and Earth-satellite communications. Storage applications include, but are not necessarily limited to: hard disk drives, compact disks, digital video disks, magnetic tapes and memory devices such as DRAM, NAND flash, NOR flash, other nonvolatile memories and solid state drives.

In addition, it should be noted that, in embodiments, the storage system 100 is configured to include solid state memory to store data in addition to the storage offered by the disk platter 178. In embodiments, solid state memory is used in parallel to the disk platter 178 to provide additional storage. In embodiments, the solid state memory receives and/or provides information directly to the read channel circuit 110. Additionally, in embodiments, the solid state memory is used as a cache, e.g., to provide faster access time than that offered by the disk platter 178. In embodiments, the solid state memory is disposed between the interface controller 120 and the read channel circuit 110 and operates as a pass through to the disk platter 178, e.g., when requested data is not available in the solid state memory and/or when the solid state memory does not have sufficient storage to hold a newly written data set. A variety of storage systems including disk platter 178 and solid state memory are furnished in accordance with example implementations of the present disclosure.

Figure 2:
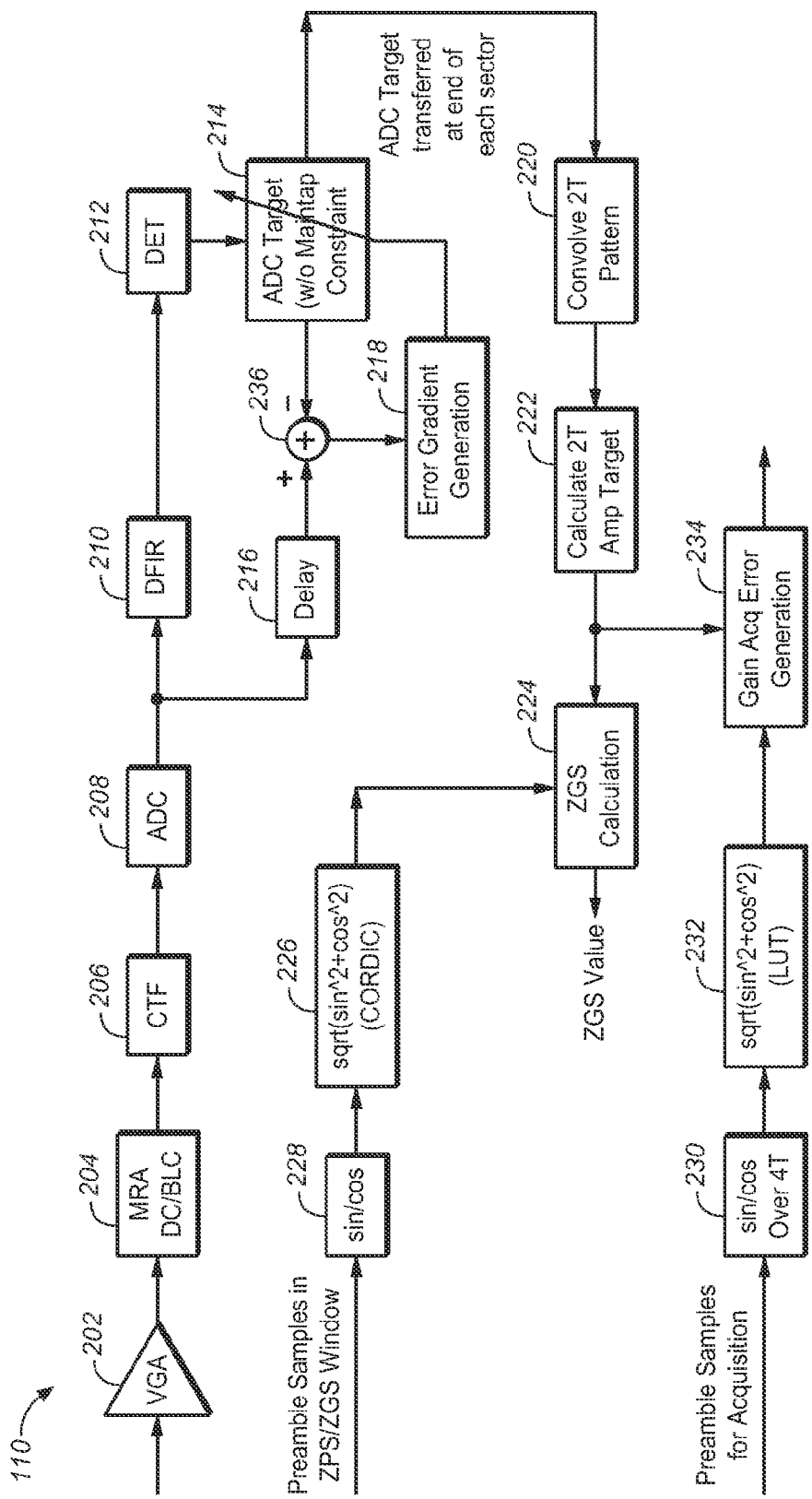
FIG. 2 is an example conceptual block diagram schematic of a read channel circuit of a storage system.

As indicated in FIG. 2 (FIG. 2), read channel 110 of the system 100 is shown. In embodiments, the read channel 110 includes an amplifier 202. For example, the amplifier 202 is a variable-gain amplifier (VGA), such as an electronic amplifier which is configured for varying its gain depending on a controlled voltage (e.g., determined by an automatic gain control loop). In embodiments, the amplifier (e.g., VGA) 202 is configured for receiving an input signal (e.g., an analog signal from the preamplifier 170) having a first power and/or first amplitude, and for generating and transmitting an output signal based upon the input signal, the output signal having a second power and/or second amplitude, the second power and/or second amplitude being a higher value (e.g., having a greater magnitude) than a value (e.g., magnitude) of the first power and/or first amplitude. A main function of the VGA 202 is to control signal level for promoting optimum performance in an analog-to-digital converter (ADC) block 208.

In embodiments, the read channel 110 further includes a magneto-resistive asymmetry (MRA) correction circuit 204, the MRA correction circuit 204 being connected to the amplifier 202. In embodiments, the MRA correction circuit 204 is configured for receiving the signal transmitted from the amplifier 202 and for generating and transmitting an output signal, the output signal of the MRA correction circuit 204 being based upon (e.g., derived from) the signal transmitted from the amplifier 202. For example, the MRA correction circuit 204 is configured for reconstructing some signal linearity that is lost at the transducer stage by using a signal offset to determine an amount of squared signal to add back to restore positive and negative symmetry for the signal.

In embodiments, the read channel 110 further includes a first filter 206, the first filter 206 being connected to the MRA correction circuit 204. For example, the first filter 206 is a continuous-time filter (CTF), which is a filter having variables which are continuous both in time and in amplitude. In embodiments, the first filter (e.g., CTF) 206 is configured for receiving the signal transmitted from the MRA correction circuit 204 and for generating and transmitting an output signal, the output signal of the first filter 206 being based upon (e.g., derived from) the signal transmitted from the MRA correction circuit 204. For instance, the first filter (e.g., CTF) 206 is configured for providing mid-band peaking to help with achieving target signal response. The first filter (e.g., CTF) 206 is further configured for keeping signal energy below a Nyquist rate in an effort to minimize any aliases that occur when the analog signal is converted to a sampled representation. For instance, the first filter (e.g., CTF) 206 is configured as a multi-pole low pass filter with a zero available for mid-band peaking.

In embodiments, the read channel 110 further includes a converter 208, the converter 208 being connected to the first filter (e.g., CTF) 206. For example, the converter 208 is an analog-to-digital converter (ADC), which is a device that uses sampling to convert a continuous quantity to a discrete time representation in a digital form. In embodiments, the ADC 208 is configured as an electronic device that provides an isolated measurement, such as converting an input analog voltage or current to a digital number proportional to the magnitude of the voltage or current. In embodiments, the converter (e.g., ADC) 208 is configured for receiving the signal transmitted from the first filter 206 and for generating and transmitting an output signal, the output signal of the converter 208 being based upon (e.g., derived from) the signal transmitted from the first filter 206. For example, the converter (e.g. ADC) 208 is configured for converting the analog signal into digital samples quantized in time and amplitude. A clock used by the ADC 208 is an output of a digital phase-locked loop which tracks a channel rate clock frequency. Further, the output of the ADC 208 is used to control the timing of the phase-locked loop, as well as the automatic gain control, direct current (DC) baseline correction and finite impulse response (FIR) adaptation.

In embodiments, the read channel 110 further includes a second filter 210, the second filter 210 being connected to the converter 208. For instance, the second filter 210 is a digital finite impulse response (DFIR) filter, which is a filter having an impulse response that is of finite duration because it settles to zero in finite time. For example, the second filter (e.g., DFIR filter) 210 performs filtering for matching a signal characteristic to an ideal target response for bit detection. In embodiments, the second filter (e.g., DFIR filter) 210 is configured for receiving the signal transmitted from the converter 208 and for generating and transmitting an output signal, the output signal of the second filter (e.g., DFIR filter) 210 being based upon (e.g., derived from) the signal transmitted from the converter 208.

In embodiments, the read channel 110 further includes a detection (DET) circuit 212, the detection circuit 212 being connected to the second filter 210. For example, the detection circuit 212 is configured for detecting the output signal transmitted from the second filter (e.g., DFIR filter) 210. In embodiments, the detection circuit 212 is configured for generating and transmitting an output, the output of the detection (DET) circuit 212 being based upon (e.g., derived from) the signal transmitted from the second filter (e.g., DFIR) 210. In embodiments, the output of the detection circuit 212 is convolved with an ADC target (e.g., a current ADC target) associated with a sector (e.g., a first sector) of data received by the read channel 110 to provide an output (e.g., an ideal ADC target) to a signal summer 236 of the read channel 110.

The signal summer 236, is connected to the converter (e.g., ADC) 208 and is configured for summing a delay element 216 of the output signal of the ADC 208 and the ideal ADC target to provide an output value (e.g., error gradient generation value) 218. The error gradient value 218 is generated based upon a difference between the current ADC target and the ideal ADC target. After processing of the sector by the read channel 110 is finished, an adaptive ADC target tap value 214 is transferred. For example, the adaptive ADC target tap value 214 which is transferred at the end of the sector is based upon the error gradient generation value 218 and the output of the detection circuit 212 at the end of processing of the sector.

In embodiments, the read channel 110 is configured for implementing (e.g., activating) ADC target adaptation (e.g., 5 taps target). For example, the zero gain start (ZGS) ADC target adaptation implemented herein is similar to, but not the same as ADC target adaptation for an automatic gain control (AGC) tracking loop, a difference being that for ZGS ADC target adaptation, there is no constraint on the main tap of the adaptive ADC target tap value 214. The read channel 110 is configured for receiving preamble samples associated with a sector of data (e.g., a second sector) which is transferred to (e.g., processed by) the read channel subsequent to completion of processing of the first sector. For example, the preamble samples (e.g., ADC preamble samples) are received by the read channel 110 in a zero gain start (ZGS)/zero phase start (ZPS) window. Further, the read channel 110 obtains sine and cosine values (sin, cos) 228 from the preamble samples. The read channel 110 is further configured for implementing a ZGS algorithm (e.g., a coordinate rotation digital computer (CORDIC) algorithm) and the sine and cosine values 228 obtained from the preamble samples associated with the second sector to calculate an amplitude (e.g., actual amplitude, actual 2T amplitude, actual 2T amplitude value, adc_2T_amp) 226 via the following equation:

$$adc\_2T\_amp = sqrt(sin\textasciicircum2 + cos\textasciicircum2)$$

In further embodiments, the read channel 110 is further configured for convolving a 2T pattern 220 with the adaptive ADC target tap value 214 to calculate a 2T amplitude target (e.g., adaptive ADC target, ideal 2T amplitude, target 2T amplitude, target 2T amplitude value, adc_2T_amp_target) 222 via the following equation:

$$adc\_2T\_amp\_target = sqrt(sin\textasciicircum2 + cos\textasciicircum2)$$

The sine and cosine values used in calculating the adaptive ADC target (e.g., ideal 2T amplitude) are associated with the previously processed first sector of data. The read channel 110, during ZGS calculation 224, is further configured for calculating a ZGS value (e.g., an adjusted 2T amplitude target value) based on the calculated actual 2T amplitude value (e.g., adc_2T_amp) 226 and the calculated target 2T amplitude value (e.g., adc_2T_amp_target) 222 via the following equation:

$$adc\_2T\_amp\_target/adc\_2T\_amp$$

The read channel 110 is configured for implementing a CORDIC algorithm for calculating the ZGS value 224. The target 2T amplitude value 222 is used to collect channel conditions of the read channel 110 and the adjusted 2T amplitude target value (e.g., ZGS value) 224 is generated based upon the target 2T amplitude value 222 and the actual 2T amplitude value 226. The CORDIC algorithm is configured for promoting improved resolution (e.g., 0.05 decibels (dB)), smaller bias (e.g., removal of ZGS bias), and improved loss characteristics compared to legacy systems implementing ZGS. The ZGS value 224 provides a metric for indicating a discrepancy or difference between the target 2T amplitude value 222 and the actual 2T amplitude value 226 and is applied to the VGA 202.

In embodiments, the read channel 110 is further configured for implementing a gain acquisition scheme based upon the adaptive ADC target 222 (e.g., the target 2T amplitude value) for promoting improved gain acquisition performance of the read channel 110. As mentioned above, the read channel 110 is configured for receiving the preamble samples (e.g., ADC preamble samples) associated with the second sector of data. Further, the read channel 110 is configured for obtaining sine and cosine values 230 (e.g., over 4T) from the preamble samples. For example, the update period is 4T, such that every four preamble samples are used for gain acquisition error calculation. Still further, the read channel 110 is configured for calculating gain acquisition error (232, 234) based upon the received acquisition preamble samples and the target 2T amplitude value via the following equation:

$$sqrt(sin\textasciicircum2 + cos\textasciicircum2)$$

For instance, the read channel 110 is configured for implementing a lookup table (LUT) when calculating gain acquisition error for promoting latency reduction.

Figure 3:
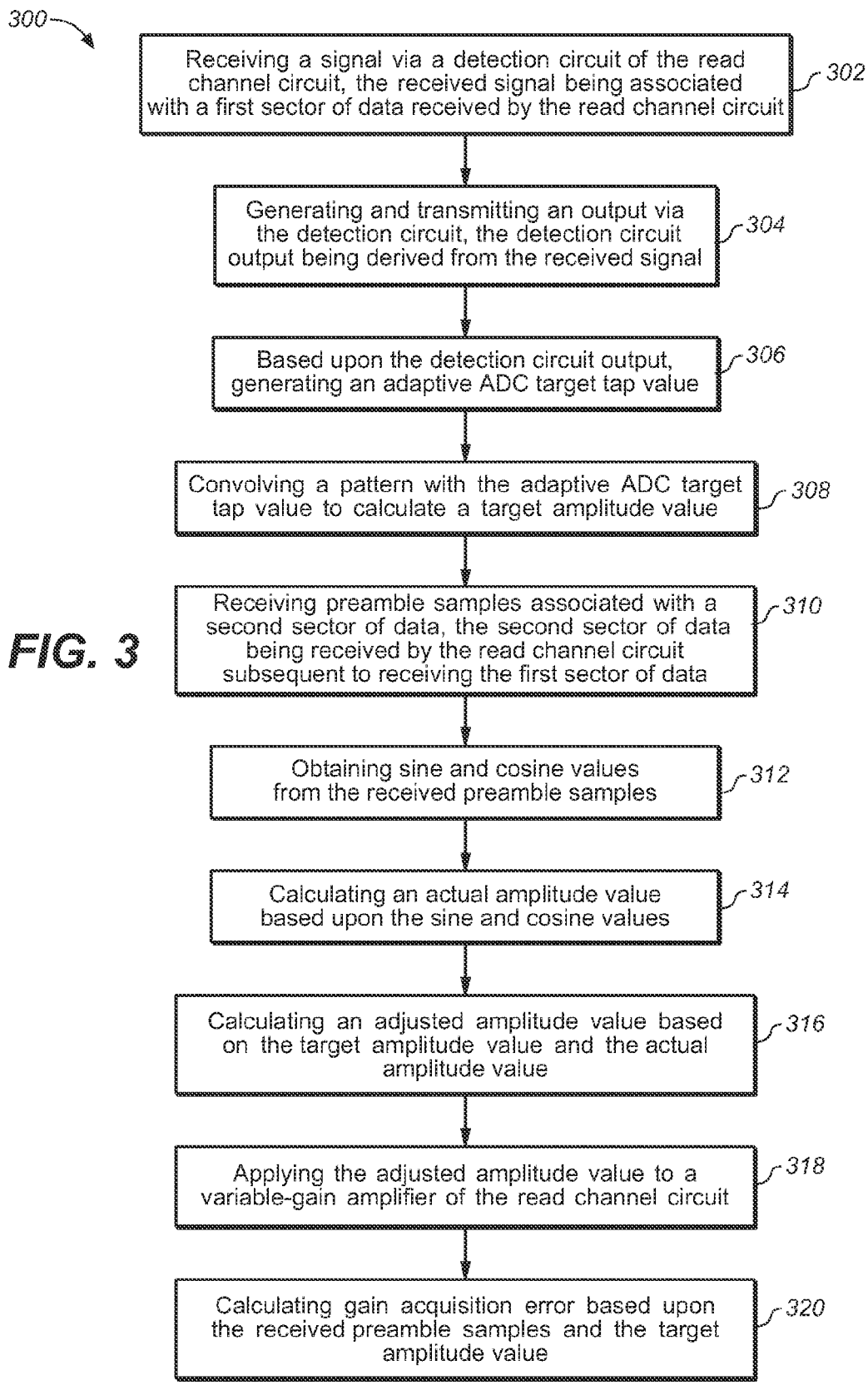
FIG. 3 is a flow chart illustrating a method for providing zero gain start and gain acquisition in a read channel circuit of a storage system.

FIG. 3 is a flowchart illustrating a method for providing zero gain start and gain acquisition in a read channel of a storage system. In embodiments, the method 300 includes the step of receiving a signal via a detection circuit of the read channel 302. For example, the signal is a filter output signal associated with a sector of data (e.g., a first sector of data) received by the read channel 110 and provided to the detection circuit 212 by the DFIR filter 210. The method 300 further includes the step of generating and transmitting an output via the detection circuit, the detection circuit output being derived from the received signal 304. The method 300 further includes, based upon the detection circuit output, generating an adaptive ADC target tap value 306. In embodiments, the adaptive ADC target tap value is associated with (e.g., transferred at the end of processing of) the first sector.

The method 300 further includes the step of convolving a pattern with the adaptive ADC target tap value to calculate a target amplitude value (e.g., an adaptive ADC target, a 2T amplitude target value) 308. For example, the read channel 110 is configured for convolving a 2T pattern 220 with the adaptive ADC target tap value 214 to calculate a target amplitude value (e.g., a 2T amplitude target) 222. The method 300 further includes the step of receiving preamble samples 310 associated with a second sector of data, the second sector of data being received (e.g., processed) by the read channel 110 subsequent to receiving (e.g., processing, completing processing of) the first sector of data. The method 300 further includes the step of obtaining sine and cosine values from the received preamble samples 312. For instance, the read channel 110 is configured for obtaining sine and cosine values from the received preamble samples. The method 300 further includes the step of calculating an amplitude value (e.g., an actual amplitude value, an actual 2T amplitude) based upon the sine and cosine values 314. The method 300 further includes the step of calculating an adjusted amplitude value (e.g., a ZGS value, an adjusted 2T amplitude value) based on the target amplitude value and the actual amplitude value 316. For example, the read channel 110 is configured for implementing a ZGS (e.g., CORDIC) algorithm for calculating the ZGS value. The method 300 further includes the step of applying the adjusted amplitude value to a variable-gain amplifier (VGA) of the read channel 318.

The method 300 further includes the step of calculating gain acquisition error based upon the received preamble samples and the target amplitude value 320. For example, the read channel 110 is configured for obtaining sine and cosine values from the preamble samples over 4T and implementing a lookup table (LUT) to calculate the gain acquisition error based upon the received preamble samples.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage system, comprising:
   a storage device;
   a preamplifier connected to the storage device, the preamplifier configured for receiving a signal output from the storage device and generating and transmitting an analog signal output derived from the received signal output; and
   a read channel circuit connected to the preamplifier, the read channel circuit configured for receiving the analog signal output and generating and transmitting a digital signal output derived from the received analog signal output, the received analog signal output corresponding to a first sector of data received by the read channel circuit,
   wherein the read channel circuit is configured to calculate a zero gain start value based on a 2T target amplitude value, the 2T target amplitude value being derived from the analog signal output received by the read channel circuit, the read channel circuit configured to:
   calculate the 2T target amplitude value by convolving a pattern with an adaptive analog-to-digital converter target tap value, the adaptive analog-to-digital converter target tap value being associated with the first sector,
   receive preamble samples associated with a second sector of data,
   calculate an actual amplitude value based upon sine and cosine values obtained from the preamble samples,
   calculate an adjusted amplitude value based upon the 2T target amplitude value and the amplitude value, and
   apply the adjusted amplitude value to a variable-gain amplifier associated with the read channel.

2. The storage system as claimed in claim 1, wherein the storage system is a hard disk drive.

3. The storage system as claimed in claim 2, wherein the storage device is a disk platter.

4. The storage system as claimed in claim 1, wherein the read channel circuit is configured for receiving preamble samples associated with a second sector of data which is processed by the read channel circuit subsequent to processing the first sector of data.

5. The storage system as claimed in claim 1, wherein the read channel circuit is configured for calculating gain acquisition error based upon the received preamble samples and the target amplitude value.

6. A method for providing zero gain start and gain acquisition in a read channel circuit of a storage system, comprising:
   receiving a signal via a detection circuit of the read channel circuit, the received signal being associated with a first sector of data received by the read channel circuit;
   generating and transmitting an output via the detection circuit, the detection circuit output being derived from the received signal;
   based upon the detection circuit output, generating an adaptive analog-to-digital converter target tap value;
   convolving a pattern with the adaptive analog-to-digital converter target tap value to calculate a 2T target amplitude value;
   receiving preamble samples associated with a second sector of data, the second sector of data being received by the read channel circuit subsequent to receiving the first sector of data;
   calculating an actual amplitude value based upon sine and cosine values obtained from the preamble samples;
   calculating an adjusted amplitude value based upon the 2T target amplitude value and the amplitude value; and
   applying the adjusted amplitude value to a variable-gain amplifier associated with the read channel.

7. The method as claimed in claim 6, further comprising:
   calculating gain acquisition error based upon the received preamble samples and the target amplitude value.

8. The method as claimed in claim 6, wherein the adjusted amplitude value is a zero gain start value.

9. The method as claimed in claim 8, wherein a coordinate rotation digital computer algorithm is implemented by the read channel circuit for calculating the zero gain start value.

10. The method as claimed in claim 6, wherein a lookup table is implemented by the read channel circuit when calculating the gain acquisition error.

11. The method as claimed in claim 6, wherein the storage system is a hard disk drive.

12. A non-transitory computer-readable medium having computer-executable instructions for performing a method for providing zero gain start and gain acquisition in a read channel of a storage system, the method comprising:
- receiving a signal via a detection circuit of the read channel circuit, the received signal being associated with a first sector of data received by the read channel circuit;
- generating and transmitting an output via the detection circuit, the detection circuit output being derived from the received signal;
- based upon the detection circuit output, generating an adaptive analog-to-digital converter target tap value;
- convolving a pattern with the adaptive analog-to-digital converter target tap value to calculate a target amplitude value;
- receiving preamble samples associated with a second sector of data, the second sector of data being received by the read channel circuit subsequent to receiving the first sector of data;
- obtaining sine and cosine values from the received preamble samples;
- calculating an actual amplitude value based upon the sine and cosine values;
- calculating an adjusted amplitude value based on the target amplitude value and the actual amplitude value;
- applying the adjusted amplitude value to a variable-gain amplifier of the read channel circuit; and
- calculating gain acquisition error based upon the received preamble samples and the target amplitude value.

* * * * *